United States Patent [19]

Johnson, Jr.

[11] 4,280,826
[45] * Jul. 28, 1981

[54] BAG-TYPE FILTER APPARATUS WITH HIGH PRESSURE AIR JET CLEANING

[75] Inventor: Allen S. Johnson, Jr., Salisbury, N.C.

[73] Assignee: Staclean Diffuser Company, Salisbury, N.C.

[*] Notice: The portion of the term of this patent subsequent to Nov. 4, 1997, has been disclaimed.

[21] Appl. No.: 81,461

[22] Filed: Oct. 3, 1979

Related U.S. Application Data

[63] Continuation-in-part of Ser. No. 76,605, Sep. 18, 1979, Pat. No. 4,231,770.

[51] Int. Cl.³ .............................................. B01D 46/04
[52] U.S. Cl. ........................................ 55/302; 55/379
[58] Field of Search ................. 55/302, 341 R, 379, 55/293, 368; 210/333 R, 356, 411, 427

[56] References Cited

U.S. PATENT DOCUMENTS

| | | | |
|---|---|---|---|
| 2,828,017 | 3/1958 | Ronningen et al. | 55/303 X |
| 3,471,024 | 10/1969 | Doucet | 210/411 X |
| 4,058,379 | 11/1977 | Cheng | 55/302 |
| 4,133,657 | 1/1979 | Krogsrud | 55/302 X |
| 4,210,538 | 7/1980 | Tantillo et al. | 210/427 X |
| 4,231,770 | 11/1980 | Johnson, Jr. | 55/302 |

FOREIGN PATENT DOCUMENTS

| | | | |
|---|---|---|---|
| 909345 | 10/1962 | United Kingdom | 55/294 |
| 453176 | 1/1975 | U.S.S.R. | 55/302 |

Primary Examiner—Kathleen J. Prunner
Attorney, Agent, or Firm—Bell, Seltzer, Park & Gibson

[57] ABSTRACT

The cleaning of a tubular filter bag supported by a tubular supporting cage positioned within the filter bag is significantly enhanced by the provision of an elongate air distributor pipe extending into one end of the filter bag and longitudinally along the interior of the supporting cage and filter bag, with the air distributor pipe having a plurality of air outlet openings therein for distributing compressed air throughout the interior of the filter bag. An elongate hollow diffuser tube extends longitudinally within the supporting cage and filter bag in surrounding relation to the air distributor pipe, the diffuser tube having perforations therein for diffusing and further distributing throughout the filter bag the compressed air which is discharged from the air distributor pipe.

10 Claims, 6 Drawing Figures

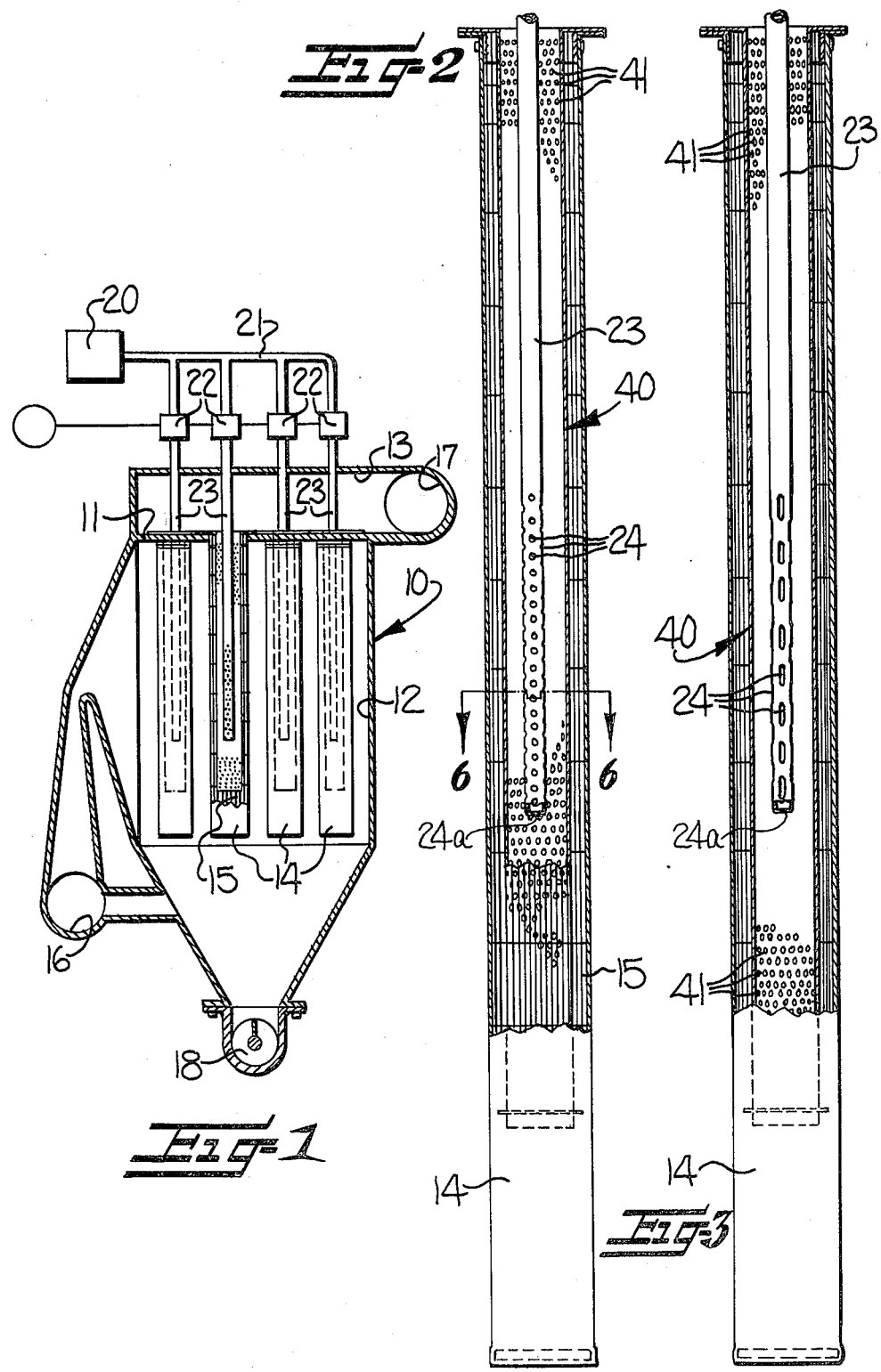

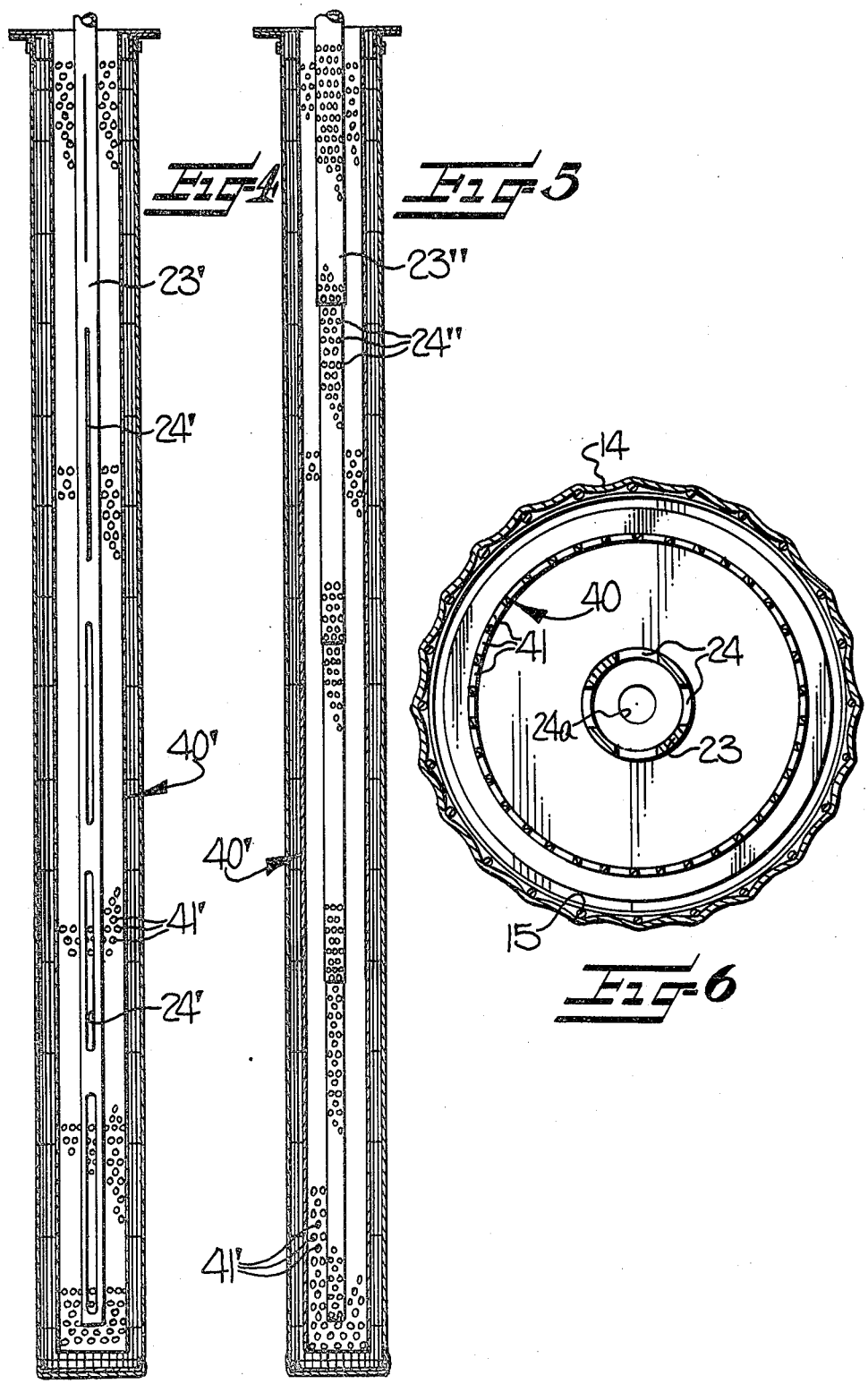

BAG-TYPE FILTER APPARATUS WITH HIGH PRESSURE AIR JET CLEANING

CROSS REFERENCE TO RELATED APPLICATION

This application is a continuation-in-part of my copending application Ser. No. 076,605 filed Sept. 18, 1979 and entitled Bag-Type Filter Apparatus with Internal Air Diffuser, now U.S. Pat. No. 4,231,770.

BACKGROUND OF THE INVENTION

In my aforementioned copending application I have disclosed an improvement in a bag-type filtering apparatus which provides significantly more effective cleaning of the filter bags when the bags are periodically backflushed by a reverse purge of air. As disclosed in the aforementioned copending application, means is provided extending longitudinally within the filter bag for diffusing and distributing air throughout the filter bag when a periodic reverse purge of air is directed into the filter bag. More particularly, a hollow diffuser tube is positioned within the filter bag, with the diffuser tube having perforations therein located for diffusing and distributing air throughout the filter bag when a periodic reverse purge of air is directed into the filter bag and into the diffuser tube. This arrangement prevents the otherwise concentration of the reverse purge of air in localized areas of the filter bag resulting in uneven and inefficient cleaning of the filter bag. The more uniform distribution of the purge of air throughout the filter bag achieves considerably more effective cleaning of the filter bag than has heretofore been possible in a conventional bag-type filtering system.

The present invention discloses an arrangement in which a diffuser tube of the type disclosed in my aforementioned copending application is employed in a particular type of filtering apparatus to obtain more effective utilization of the periodic reverse purges of air and to thereby obtain improved and more effective cleaning of the filter bags.

There are a variety of different types of filtering systems which employ tubular filter bags. In the particular type of filtering apparatus with which the present invention is concerned, a group of tubular filter bags are mounted in a filter housing or "baghouse" with each filter bag being supported in open hollow tubular configuration. Particulate-laden gas is directed into the filter housing and flows through the gas permeable filter bags while the particulate material is filtered and retained on the exterior surface of the filter bags. Periodically, the filter bags are cleaned by directing compressed air into the tubular filter bags to thereby flex or move the filter bags and dislodge the trapped particulate material from the exterior surface of the filter bags. The compressed air is directed into the filter bags as a high velocity jet pulse of compressed air from a pipe located outside of the filter bag and in axial alignment with the open outlet end thereof. The jet pulse of compressed air is intended to sweep longitudinally along the interior of the filter bag from the open outlet end to the closed opposite end thereof in a wavelike fashion causing a momentary expansion or flexing of the filter bag for dislodging the accumulated particulate material from the exterior of the filter bag. This type of filter bag cleaning arrangement is shown by way of example in prior U.S. Pat. Nos. 3,535,852; 4,073,632 and 4,157,901.

One of the problems with this type filtering apparatus is that the above-noted type of jet pulse cleaning arrangement is not very effective in removing the particulate material from the filter bags. After the filter bags have been in use for a period of time they become increasingly clogged with particulate material. This undesirably increases the pressure drop across the filtering apparatus and significantly reduces its efficiency.

Attempts have been made to increase the effectiveness of the jet pulse of compressed air in this prior type of filter bag cleaning arrangement by installing a venturi nozzle adjacent the open outlet end of the filter. The venturi nozzle is intended to increase the effect of the jet pulse of air to enable it to reach the full length of the filter bag. However, these attempts have not been fully effective in overcoming the problem of inadequate cleaning of the filter bag. It has been observed that in filtering systms utilizing the above-noted type of jet pulse cleaning arrangement, the filter bags are cleaned fairly well at the upper end thereof adjacent where the jet pusle of air enters the filter bag, but very little cleaning of the filter bag takes place at the lower end of the filter bag. Apparently, the pulse or jet of compressed air is substantially dissipated by the time it reaches the far end of the filter bag. Thus in this type of cleaning arrangement, the entire length of the filter bag has not been effectively utilized for filtration and the efficiency of the filter bag has been reduced accordingly.

SUMMARY OF THE INVENTION

In accordance with the present invention, the cleaning of a filter bag is significantly enhanced by discharging the pulses of compressed air interiorly of the filter bag and by positioning a hollow diffuser tube within the filter bag to assist in further diffusing and distributing throughout the filter bag the compressed air which is discharged during the periodic cleaning operations.

More particularly, in accordance with the present invention an elongate air distributor pipe is provided extending into the open outlet end of the filter bag and longitudinally along the interior of the filter bag. One end of the air distributor pipe is communicatively connected to the control valve which controls the periodic pulses of compressed air, and the opposite end of this pipe has outlet openings provided therein and located within the interior of the filter bag for distributing the compressed air throughout the interior of the filter bag. An elongate hollow diffuser tube extends longitudinally within the tubular filter bag in surrounding relation to the air distributor pipe. The diffuser tube has perforations therein for diffusing and further distributing throughout the filter bag the compressed air which is discharged from the air distributor pipe.

While the present invention has been described as being particularly applicable to a filtering apparatus having a jet pulse type of cleaning arrangement wherein a pulse or jet of compressed air is discharged from a pipe located outside of the filter bag and in axial alignment with the open outlet end thereof, it should be noted that the present invention is also applicable to those types of filtering systems in which a pipe extends interiorly of the filter bag for discharging air or other fluid for cleaning of the filter bag.

In accordance with one embodiment of the invention, the air distributor pipe extends longitudinally within the filter bag less than the full length of the filter bag, and the diffuser tube also extends longitudinally within the filter bag for a distance less than the full length of the filter bag but extends longitudinally further than the air distributor pipe.

In another embodiment of the invention, both the air distributor pipe and the hollow perforated diffuser tube extend within the filter bag for substantially the entire length of the filter bag.

Since the hollow perforated diffuser tube presents an obstruction to the flow of air through the filter, it would normally be thought that the diffuser tube would interfere with the filtering operation by undesirably increasing the pressure drop across the filter. However, it has been surprisingly determined that the flow obstruction presented by the diffuser tube does not interfere with the filtering operation, but in fact, significantly enhances the filtering operation by providing improved and more effective cleaning of the filter bag. The diffuser tube does produce a slight flow obstruction and results in a somewhat increased pressure drop upon start-up with a new filter bag installed. However, once the filter bag has been placed into service and undergone one or more cleaning cycles, the pressure drop through the filter bag is actually considerably lower than in the prior art filter arrangements, which do not employ a diffuser tube, as a result of the greatly enhanced cleaning of the filter bag. The increased cleaning efficiency which is achieved results in increasing the volumetric flow rate through the filter bag at a given pressure drop by some two or three times. This means that the number of filter bags needed for a particular set of conditions can be significantly reduced. No longer will it be necessary for filter baghouses to be over-designed in order to take into acount or compensate for the reduction in efficiency and increased pressure drop which occurs as the filter bags become clogged during normal service. Thus, the present invention can provide a very significant savings in the overall initial cost of a filtering apparatus, and an attendant benefit in reduced maintenance and operational costs.

A further feature and advantage of the present invention is that the useful life of the filter bags is greatly increased. The enhanced cleaning efficiency which is achieved by the present invention results in the removal of particles which would otherwise have remained in the pores of the filter bag to cause abrasive wear of the fabric forming the filter bag. Further, the presence of the hollow perforated diffuser tube inside the filter bag serves to separate or insulate the inner surfaces of the filter bag from the high velocity stream of filtered air emerging from the outlet end of the filter bag, which would otherwise flow along the inner surface of the filter bag and cause additional wear in this area. Also, by diffusing and distributing the cleaning pulse of air throughout the filter bag, the perforated diffuser tube prevents the filter bag from receiving excessive flexing from a concentrated blast or pulse of air and thereby also serves to increase the life of the filter bag.

BRIEF DESCRIPTION OF THE DRAWINGS

Some of the features and advantages of the invention having been stated, others will become apparent as the description proceeds when taken in connection with the accompanying drawings in which:

FIG. 1 is a cross-sectional view of a filtering apparatus of the type employing a plurality of bag-type tubular filters, and utilizing an arrangement in accordance with the present invention for cleaning the filter bags with a reverse purge of compressed air;

FIG. 2 is a side view showing one of the filter bags in the filtering apparatus of FIG. 1, with parts thereof broken away to more clearly shown the air distributor pipe and diffuser tube located within the filter bag;

FIG. 3 is a side view similar to FIG. 2 showing an alternate form of the air distributor pipe;

FIG. 4 is a side view similar to FIG. 2 showing an air distributor pipe and diffuser tube in accordance with a further embodiment of the invention;

FIG. 5 is a side view similar to FIG. 4 showing an alternate form of the air distributor pipe in accordance with the invention; and FIG. 6 is a cross-sectional view taken substantially along the line 6—6 of FIG. 2.

DESCRIPTION OF THE ILLUSTRATED EMBODIMENTS

Referring now more particularly to the drawings, FIG. 1 illustrates a filtering apparatus of the type utilizing elongate baglike tubular filters. The filtering apparatus includes a filter housing 10, commonly referred to as a "baghouse," which is divided by horizontal wall 1 into a lower filtering chamber 12 and an upper filtered air plenum 13. A plurality of elongate hollow tubular filter bags, indicated by the reference character 14, are mounted in the filtering chamber 12 in a generally vertical orientation with the upper ends thereof communicating with the filtered air plenum 13 via holes provided in the wall 11.

Each filter bag 14 is made of a gas permeable fabric and is in a form similar to a sock, having a closed lower end and an open upper end. An elongate tubular supporting frame 15, commonly termed a "cage," is positioned within the filter bag 14 and serves to hold the filter bag in an open tubular configuration and to prevent it from colapsing inwardly upon itself during the filtering operation as the particulate-laden gas passes therethrough. The supporting frame or cage 15 is of openwork construction for readily allowing the flow of air therethrough, and is typically formed of heavy wire.

An inlet duct 16 directs particulate-laden gas into the filtering chamber 12, where it passes around the respective filter bags 14 and then flows through the gas permeable filter bags while the particulate material is filtered and retained on the exterior surface of the filter bags. After passing into the hollow interior of the filter bags 14, the filtered gas passes upwardly through the outlet ends of the respective filter bags and into the filtered air chamber 13. From there, the filtered gas is directed to and through an outlet duct 17.

As the particulate material builds up on the exterior surface of the filter bags 14, it becomes necessary to clean the filter bags and dislodge the accumulated particulate material therefrom. This is accomplished by periodically directing a pulse or blast of compressed air into the filter bags in a reverse direction from the normal direction of flow of the filtered air. The particulate material which is dislodged from the filter bags is accumulated at the lower end of the filter housing 10 and removed by a screw conveyor 18.

In the filtering apparatus illustrated in FIG. 1, compressed air from a compressed air source 20 flows along a compressed air main or manifold 21 and to a plurality of individual control valves 22. At each control valve 22 and air distributor pipe 23 has one end thereof connected to the outlet side of the control valve 22 with the pipe extending axially into the open outlet end of one of the filter bags 14 and longitudinally along the interior of the filter bag. The pipe 23 has a plurality of air outlet openings 24 formed therein and arranged interiorly of the filter bag for distributing the compressed air throughout the interior of the filter bag. During the operation of the filtering apparatus the respective individual control valves 22 are selectively and individually opened momentarily to thereby discharge a blast or pulse of compressed air along the air distributor pipe 23 and into the interior of the associated filter bag for thereby cleaning the filter bag without disrupting the operation of the other filter bags in the filter housing.

In the arrangement illustrated in FIG. 1, the air distributor pipe 23 extends from the control valve 22 into a single filter bag 14. However, the air distributor pipe 23 may also be of a branched configuration with branches extending into more than one filter bag 14 so that a single control valve 22 may serve several individual filter bags.

In accordance with the invention and as illustrated herein, there is mounted within the tubular filter bag, in addition to the elongate air distributor pipe 23 previously described, an elongate hollow diffuser tube, generally indicated by the reference character 40. As illustrated, the diffuser tube 40 is of a cross-sectional shape and diameter adapted for being received within the surrounding supporting cage 15 and substantially out of contact with the filter bag 14. The diffuser tube 40 has perforations 41 formed therein and located substantially throughout the longitudinal and circumferential extent of the diffuser tube for assisting in diffusing and further distributing throughout the filter bag the pulse of compressed air which is discharged form the air distributor pipe 23. The diffuser tube 40 is constructed in accordance with my copending U.S. application Ser. No. 076,605 filed Sept. 18, 1979, and entitled Bag-Type Filter Apparatus with Internal Air Diffuser. To the extent necessary for a complete understanding of the construction and operation of the diffuser tube 40, the disclosure of my aforementioned copending application is hereby incorporated by reference.

In the embodiment of the invvention illustrated in FIGS. 1-3, the elongate air distributor pipe 23 extends axially along the interior of the filter bag for a distance substantially less than the entire length of the filter bag. As illustrated, the air distributor pipe 23 extends within the filter bag for a distance somewhat greater than half the overall length of the filter bag. The air outlet openings 24 are located in the distal end portion of the pipe, with the portion of the pipe adjacent the discharge end of the filter bag not having any air outlet openings. thus, the air oulet openings are present in areas of the air distributor pipe which are spaced longitudinally away from the discharge end of the filter bag. In the embodiment illustrated in FIG. 2, the air outlet openings 24 are in the form of circular holes, while the embodiment shown in FIG. 3 the outlet openings are in the form of elongate slotlike openings. In both arrangements the air outlet openings are formed in several radially spaced locations around the circumference of the pipe. Preferably, and as illustrated, one or more air outlet openings 24a is also present in the end of the pipe 23 for directing air longitudinally into the lowermost portions of the filter bag 14. As illustrated, the elongate hollow diffuser tube 40 also extends axially along the interior of the filter bag for less than the entire length of the filter bag, but the diffuser tube 40 is longer than and extends beyond the air distributor pipe 23, with the lower end of the diffuser tube 40 being open. In the illustrated embodiment, the diffuser tube 40 has a length somewhat greater than three fourths the length of the filter bag.

In the embodiments of the invention shown in FIGS. 4 and 5, both the air distributor pipe and the air diffuser tube extend longitudinally within the filter bag for substantially the entire length of the filter bag. The air outlet openings in the air distributor pipe and the perforations in the air diffuser tube are also distributed substantially throughout the longitudinal extent of the filter bag.

In the embodiment shown in FIG. 4 the air distributor pipe is indicated by the reference character 23' and the air oulet openings by the reference character 24'. As illustrated, the air outlet openings are in the form of elongate longitudinally extending slots provided at arcuately spaced locations about the circumference of the pipe 23'. As illustrated, the slotlike air outlet openings 24' are of varying widths, with the slots being relatively narrow adjacent the upper or discharge end of the filter bag, and with the slots becoming gradually wider toward the lower distal end of the pipe. The variation in slot width assists in obtaining a more uniform distribution of the compressed air pulse throughout the entire longitudinal extent of the air distributor pipe 23', and thus insures that a sufficiently intense and effective pulse of air is present at the lower or distal end of the air distributor pipe as well as at the upper end of the pipe located closest to the compressed air source.

In the embodiment illustrated in FIG. 5, the air distributor pipe is indicated by the reference character 23" and the air oulet openings by the reference character 24". As illustrated, the pipe 23" varies in cross section throughout its longitudinal extent, with the cross sectional area being realtively large adjacent the upper end of the pipe closest to the source of compressed air and being of smaller cross-sectional area approaching the lower or distal end of the pipe. This variation in cross section assists in obtaining a more uniform velocity distribution of the compressed air pulse throughtout the length of the pipe. The air outlet openings 24" are in the form of circular holes substantially uniformly distributed throughout the longitudinal and circumferential extent of the pipe.

The air diffuser tube, indicated by the reference character 40' in FIGS. 4 and 5 is similar to that previously described in connection with FIGS. 1-3 except that its length substantially corresponds to the overall length of the filter bag 14 and its supporting cage 15.

From the foregoing description it should be apparent that the present invention provides a new and advantageous arrangement for obtaining more effective utilization of the reverse blasts or pulses of compressed air which are directed into a filter bag for cleaning purposes. The more effective utilization of the reverse pulses or blasts of air achieves significantly more effective cleaning of the filter bag and thus provides a substantial increase in the efficiency of the filter apparatus.

In the drawings and specification, there have been set forth preferred embodiments of the invention, and although specific terms are employed, they are used in a generic and descriptive sense only and not for purposes of limitation.

That which is claimed is:

1. In a filter apparatus of the type wherein a particulate-laden gas is directed through a tubular filter bag for filtering and retaining the particulate material on the exterior of the bag, with the filtered air being discharged from one end of the filter bag, a tubular supporting cage positioned within the filter bag and supporting the filter bag thereon, and said filter apparatus also having a cleaning system including a compressed air control valve communicating with a compressed air source for periodically discharging pulses of compressed air for cleaning and removing accumulated particulate material from the filter bag, the combination therewith of an elongate air distributor pipe having one end communicatively connected to said control valve for receiving the periodic pulses of compressed air therefrom, said elongate air distributor pipe extending into said one end of the filter bag and also into said filter bag supporting cage and being positioned longitudinally along the interior of said supporting cage and filter bag, and said air distributor pipe having a plurality of air outlet openings therein for distributing the compressed air throughout the interior of the filter bag, and an elongate hollow diffuser tube extending longitudinally within said tubular supporting cage and said filter bag in surrounding relation to said air distributor pipe, said diffuser tube having perforations therein for diffusing and further distributing throughout the filter bag the compressed air which is discharged from said air distributor pipe to thus more effectively clean the filter bag and provide a substantial increase in the efficiency of the filter apparatus.

2. The combination as set forth in claim 1 wherein said air distributor pipe extends longitudinally within said filter bag less than the full length of the filter bag.

3. The combination as set forth in claim 2 wherein said diffuser tube also extends longitudinally within said filter bag for a distance less than the full length of the filter bag but extends longitudinally further than said air distributor pipe.

4. The combination as set forth in claim 1 wherein said air distributor pipe extends longitudinally within said filter bag for substantially the entire length of the filter bag.

5. The combination as set forth in claim 4 wherein said diffuser tube also extends longitudinally within said filter bag for substantially the entire length of the filter bag.

6. The combination as set forth in claim 1 wherein said air outlet openings are present in areas of said air distributor pipe spaced longitudinally away from the discharge end of the filter bag.

7. The combination as set forth in claim 1 wherein said air outlet openings are present substantially throughout the longitudinal extent of said air distributor pipe.

8. The combination as set forth in any one of claims 1 to 7 wherein said diffuser tube is positioned within said supporting cage substantially out of contact with said surrounding filter bag.

9. In a filter apparatus of the type wherein a particulate-laden gas is directed through a tubular filter bag for filtering and retaining the particulate material on the exterior of the bag, with the filtered air being discharged from one end of the filter bag, a tubular supporting cage positioned within the filter bag and supporting the filter bag thereon, and said filter apparatus also having a cleaning system including a compressed air control valve communicating with a compressed air source for periodically discharging pulses of the compressed air for cleaning and removing accumulated particulate material from the filter bag, the combination therewith of an elongate air distributor pipe having one end communicatively connected to said control valve for receiving the periodic pulses of compressed air therefrom, said elongate air distributor pipe extending into said one end of the filter bag and also into said filter bag supporting cage and being positioned longitudinally along the interior of said supporting cage and the filter bag for a substantial distance but less than the full length of the filter bag, and said air distributor pipe having a plurality of air outlet openings therein for distributing the compressed air throughout the interior of the filter bag, and an elongate hollow diffuser tube extending longitudinally within said tubular supporting cage and said filter bag for a distance greater than said air distributor pipe but substantially less than the full length of the filter bag, and said diffuser tube being positioned in inwardly spaced, substantially noncontacting relation with said filter bag and in surrounding relation to said air distributor pipe, said diffuser tube having perforations substantially throughout for diffusing and further distributing throughout the filter bag the compressed air which is discharged from said air distributor pipe to thus more effectively clean the filter bag and provide a substantial increase in the efficiency of the filter apparatus.

10. In a filter apparatus of the type wherein a particulate-laden gas is directed through a tubular filter bag for filtering and retaining the particulate material on the exterior of the bag, with the filtered air being discharged from one end of the filter bag, a tubular supporting cage positioned within the filter bag and supporting the filter bag thereon, and said filter apparatus also having a cleaning system including a compressed air control valve communicating with a compressed air source for periodically discharging pulses of the compressed air for cleaning and removing accumulated particulate material from the filter bag, the combination therewith of an elongate air distributor pipe having one end communicatively connected to said control valve for receiving the periodic pulses of compressed air therefrom, said elongate air distributor pipe extending into said one end of the filter bag and also into said filter bag supporting cage and being positioned longitudinally along the interior of said supporting cage and the filter bag for substantially the entire length thereof, and said air distributor pipe having a plurality of air oulet openings located throughout substantially the entire length thereof for distributing the compressed air throughout the interior of the filter bag, and an elongate hollow diffuser tube extending longitudinally within said tubular supporting cage and said filter bag for substantially the entire length thereof and positioned in inwardly spaced, substantially noncontacting relation with said filter bag and in surrounding relation to said air distributor pipe, said diffuser tube having perforations substantially throughout for diffusing and further distributing throughout the filter bag the compressed air which is discharged from said air distributor pipe to thus more effectively clean the filter bag and provide a substantial increase in the efficiency of the filter apparatus.

* * * * *

UNITED STATES PATENT AND TRADEMARK OFFICE
CERTIFICATE OF CORRECTION

PATENT NO. : 4,280,826
DATED : July 28, 1981
INVENTOR(S) : Allen S. Johnson, Jr.

It is certified that error appears in the above-identified patent and that said Letters Patent are hereby corrected as shown below:

Column 2, Line 20, "systms" should be --systems--; Line 23, "pusle" should be --pulse--.

Column 3, Line 35, "acount" should be --account--.

Column 4, Line 24, "1" should be --11--; Line 38, "colapsing" should be --collapsing--; Line 67, "and" should be --an--.

Column 5, Line 43, "embodiment" should be --embodiments--; same line, "invvention" should be --invention--; Line 52, "thus" should be --Thus--; Line 53, "oulet" should be --outlet--; Line 57, after "while" insert --in--.

Column 6, Line 33, "oulet" should be --outlet--; Line 41, "throughtout" should be --throughout--.

Column 8, Line 50, CLAIM 10, "oulet" should be --outlet--.

Signed and Sealed this

Twentieth Day of October 1981

[SEAL]

Attest:

Attesting Officer

GERALD J. MOSSINGHOFF
Commissioner of Patents and Trademarks